Feb. 23, 1954   E. SHOUCAIR   2,669,989
FRICTION REDUCING DEVICE
Filed March 15, 1948
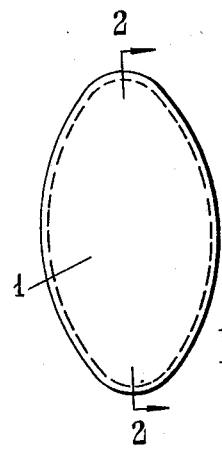
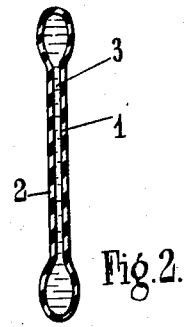
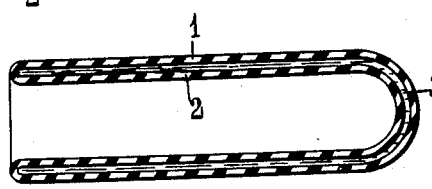
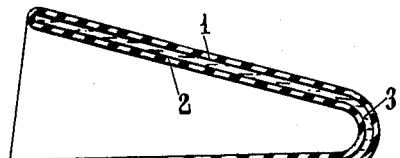
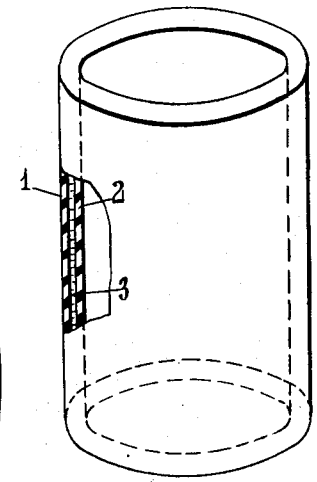
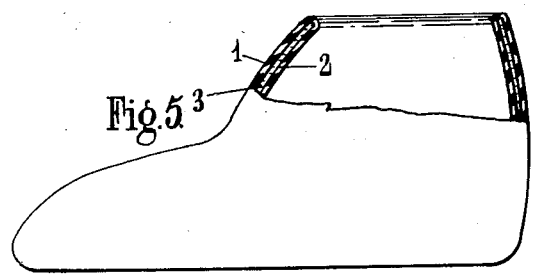
Inventor
E. Shoucair
By Ellsworth Downing Reicheld
Attys Patented Feb. 23, 1954

2,669,989

UNITED STATES PATENT OFFICE 2,669,989

FRICTION REDUCING DEVICE

Edward Shoucair, Cairo, Egypt

Application March 15, 1948, Serial No. 14,827

Claims priority, application Great Britain
April 2, 1947

3 Claims. (Cl. 128—153)

This invention which aims at substituting a smooth sliding to the undesirable friction produced by the relative movement of two rubbing bodies relates to a flat bag of some flexible material which, owing to its flatness, has two closely spaced layers designed to slide smoothly on each other, and joined by a connecting margin; the sliding of the layers is obtained either by putting a lubricating substance in the bag, which must in this case be closed and impervious to the lubricant, or simply by rendering the internal surface of the bag sufficiently smooth at the points where the layers face and are applied to each other, as in the case where these layers are evenly internally surfaced with a thin metallic coating or sheeting.

A flat envelope or bag according to the invention when inserted between a rubbing body and the skin of human beings or animals may be said to have a cutaneous layer which lies directly on the skin or on a covering such as a sock and a parietal layer which is engaged by an external body.

To indicate application of the invention it is mentioned that friction occurs between the foot and the shoe which may cause corns, blisters or delay the healing of a whitlow or chilblain. Further friction against the sacral region of a patient long confined to bed, may cause the formation of eschars, but my device if it be of suitable dimensions and appropriate shape, and inserted between the sick or threatened part (whether dressed or not) of the skin and the rubbing body (shoe or bed) with reference to which the skin moves, will reduce or eliminate friction.

The envelope may be made for instance of rubber, which has the advantage of being extensible, of nylon, of flexible plastic material, or rubber reinforced with leather or textile material.

The lubricant may be liquid, such as paraffin oil, glycerine, water or glycerine mixed with water. It may be semi-solid such as petroleum jelly or soft soap, or a powdered solid, such as talcum powder.

A lubricant chosen must be such that it will have little or no physical or chemical affinity with the material of which the envelope is made. Thus oils, as a rule, impregnate and attack natural rubber, whereas glycerine and water exert no such action.

The device is based upon the more or less close adherence of the external surface of one of the layers of the envelope to a rubbing body, and of the external surface of the other layer to another rubbing body, while the inner surfaces of the layers are applied to and slide upon each other owing to the flexibility of the connecting margin, and the presence of a lubricant which thus eliminates the friction that would have resulted from the relative movement of these rubbing bodies.

The foregoing finds its counterpart in nature in the mechanical action of articular synovials and of serous membranes; the articular synovials protect the bones, whereas the serous membranes (pleura, pericardium, peritoneum, meninges) protect the viscera (lung, heart, intestine, central nervous system) against hard frictions.

Referring now to the accompanying drawings:

Figure 1 is a side elevation of a friction reducing device according to the invention, Figure 2 is a section taken on the line 2—2, Figure 1, Figure 3 is a sectional elevation taken through the axis of a finger stall, Figure 4 is a sectional elevation of a cap for the fore part of a foot, Figure 5 is an elevation of a device to cover the whole of the foot, and Figure 6 is a side elevation, partly in section, of a sleeve for application to devices in the manner hereinafter referred to.

Like references indicate like parts throughout the drawings.

It will be seen that each of the devices illustrated comprises two closely arranged layers of flexible, impervious material and having substantially the same dimensions and shape, the margins of the layers only being joined together but not so as to be less flexible or substantially less flexible than the layers and the layers having between them a thin film of lubricant.

Referring now particularly to Figure 1, the device is oval in configuration and comprises two layers 1, 2, of sheet rubber with a film or thin layer of glycerine or glycerine and water 3 between them. The marginal edges of the layers are united to form a hermetically sealed envelope. As shown the margins of the layers are such that a hollow bead surrounds their mid-portions, the interior of the bead also containing lubricant and thus serving as a reservoir for a reserve quantity of lubricant. Such a device can be inserted between the toes of the foot to prevent them rubbing against each other or between callous skin on other surfaces of the foot and a shoe or sock. The device may if desired be held on the foot by adhesive tape or by a band of elastic secured to the device.

Figure 3 shows the device formed as a stall for the fingers or toes and in which the two layers 1, 2, of rubber are cylindrical or substantially so, and having hemispherical ends. They are integrally connected between their edges or margins by an annular part of thin rubber which is semicircular in cross section so as to form a hermetically sealed envelope and between the layers is a thin film or layer of lubricant 3 such as glycerine or glycerine mixed with water.

Figure 4 is of similar construction to Figure 3 but shaped to receive the fore-part of the foot.

Figure 5 is similar to Figure 4 but is shaped for the purpose of covering the whole of the foot and can be applied over the sock or stocking so that the outer layer 2 will contact the interior of a boot or shoe, the upper edge of the device being just below the ankle.

In Figure 6 the device is in the form of a sleeve. Such sleeves may be fitted on to the aural ends of a stethoscope, a penholder, handles of tennis and other rackets, manually operable levers or to other implements where a friction reducing device may be required.

In the following examples the layers of the envelope will have the shape of that part of the body which they are to protect against friction, and to overlay more or less that part; as to the connecting margins of the layers, they will have a bead as shown in Figure 1, to contain a reserve of lubricant and to facilitate flexing.

I claim:

1. A friction reducing device comprising a flexible envelope consisting of two superposed parallel layers of impervious material flexibly connected together by their margins, the inner surfaces of the layers being in sliding contact and having between them a film of anti-friction material whereby parallel sliding of the layers relatively to each other is facilitated during relative parallel movement of bodies in contact with the outer faces of the layers.

2. A friction reducing device as claimed in claim 1, wherein the film is a liquid lubricant and the envelope is hermetically sealed.

3. A friction reducing device as claimed in claim 2, wherein the margins of the layers are formed to provide a hollow bead which contains glycerine to facilitate flexing of the margins during relative sliding movement of the layers.

EDWARD SHOUCAIR.

References Cited in the file of this patent

UNITED STATES PATENTS

| Number | Name | Date |
|---|---|---|
| 666,541 | Moser | Jan. 22, 1901 |
| 995,687 | Kuebler | June 20, 1911 |
| 1,468,072 | Ogle | Sept. 18, 1923 |
| 1,913,928 | Kaufman | June 13, 1933 |
| 2,141,645 | Farwick | Dec. 27, 1938 |
| 2,326,159 | Mendel | Aug. 10, 1943 |
| 2,352,412 | Sandstone | June 27, 1944 |
| 2,365,556 | Karg | Dec. 19, 1944 |
| 2,421,574 | Newmark | June 3, 1947 |